US008108823B2

(12) United States Patent
Allen et al.

(10) Patent No.: US 8,108,823 B2
(45) Date of Patent: Jan. 31, 2012

(54) USER SELECTED GRID FOR LOGICALLY REPRESENTING AN ELECTRONIC CIRCUIT

(75) Inventors: Jonathan M. Allen, Rochester, MN (US); Richard Holmquist, Rochester, MN (US); Mark J. Jeanson, Rochester, MN (US); Jordan R. Keuseman, Rochester, MN (US); George R. Zettles, IV, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 12/141,453

(22) Filed: Jun. 18, 2008

(65) Prior Publication Data

US 2009/0319974 A1 Dec. 24, 2009

(51) Int. Cl.
*G06F 15/04* (2006.01)
*G06F 17/50* (2006.01)
(52) U.S. Cl. ........................................ 716/139
(58) Field of Classification Search .................... 716/139
See application file for complete search history.

(56) References Cited

U.S. PATENT DOCUMENTS

| 5,774,661 | A | | 6/1998 | Chatterjee et al. | |
|---|---|---|---|---|---|
| 6,426,745 | B1 | | 7/2002 | Isaacs et al. | |
| 7,073,154 | B1 | * | 7/2006 | Garrison et al. | 326/41 |
| 7,415,674 | B1 | * | 8/2008 | Graham et al. | 715/765 |
| 7,587,695 | B2 | * | 9/2009 | Petunin et al. | 716/137 |
| 7,665,054 | B1 | * | 2/2010 | Gopalakrishnan et al. | 716/122 |
| 7,814,455 | B2 | * | 10/2010 | Murase | 716/100 |
| 7,865,857 | B1 | * | 1/2011 | Chopra et al. | 716/119 |
| 2006/0101368 | A1 | * | 5/2006 | Kesarwani et al. | 716/11 |
| 2010/0223032 | A1 | * | 9/2010 | Reghetti et al. | 703/1 |
| 2010/0229140 | A1 | * | 9/2010 | Strolenberg et al. | 716/9 |
| 2010/0325597 | A1 | * | 12/2010 | Arsintescu | 716/111 |
| 2011/0041110 | A1 | * | 2/2011 | Zavadsky et al. | 716/112 |

OTHER PUBLICATIONS

"OrCAD Capture User's Guide"; Jul. 2005; Cadence; Version 10.5; pp. 1-1088.*

* cited by examiner

*Primary Examiner* — Suresh Memula
(74) *Attorney, Agent, or Firm* — Toler Law Group

(57) ABSTRACT

A computer implemented method employs software on a system for generating a logical representation of an electronic circuit undergoing a design. A predetermined grid for the circuit being designed is selected through interaction with the user through a graphical user interface. An input file defines objects to be plotted to the grid, and is read into a computer system. Objection locations relative to the grid, and connections between objects are checked and adjustments made by moving objects as necessary to align with the grid and to ensure connections between the objects. A design file of the adjusted logical representation is written for use in completing a circuit design.

20 Claims, 4 Drawing Sheets

USER SELECTED GRID FOR LOGICALLY REPRESENTING AN ELECTRONIC CIRCUIT

FIELD OF THE INVENTION

The present invention relates to designing an electronic circuit, and more particularly, to setting a specific grid in the design of the circuit.

BACKGROUND OF THE INVENTION

In electronics, a hardware description language or HDL is any language from a class of computer languages for formal description of electronic circuits. It can describe the circuit's operation, its design and organization, and tests to verify its operation by means of simulation. The vast majority of modern digital circuit design revolves around an HDL description of the desired circuit, device, or subsystem.

For years logical representations of electronic circuits have been used as design starting points for many products. One commercially available tool that uses a hardware description language is Concept HDL. Concept HDL is an industry tool that allows a user to render logical representations of circuits using a variety of symbols. In a typical design, lines are used to represent physical connections between parts. Symbols represent parts that are attached to those lines. Each of the lines that make the connections, as well as the symbols, are placed on a grid that is selected by and displayed to the user. However, a problem often occurs when the design teams do not use the same grid.

If the same grid is not used, if pages are copied from a previous design into a new design, and do not share the same grid, this may cause disconnects in the logical representation. This may then result in short circuits or disconnects that then become transferred to the physical connections when the final circuit is physically implemented. If the short circuits or disconnects are not caught in time, it can cost the company using the tool thousands of dollars to re-release the circuit or card being designed. If the problem occurs across multiple parts and connections, it may require an entire redesign of the physical card.

Currently tools such as Concept HDL offer no support to implement or snap a design onto a grid selected by a user. By the term "snap" is meant to move the part onto the grid or correctly place it on the grid. The only solution to a misalignment due to the use of different grids, is to guess the grid on the page of the design encountering the problem, and then to move the parts to a point on the grid selected by the user. If the grid of the page including errors cannot be discovered, then the page must be deleted and the portion of the circuit on the page must be redesigned. In multi-site design environments, it is crucially important to have a program that will allow the user to place, or snap, components to a grid of the user's choice.

For the above reasons, what is needed is a tool for design of electronic circuitry where a user is able to select a specific grid, and then create a logical representation of an electronic circuit on that grid.

SUMMARY OF THE INVENTION

The present invention provides an improved circuit design system, method and program for designing logical representations of electronic circuits on a grid selected by a user.

According to one aspect of the invention, a computer implemented method generates a logical representation of an electronic circuit being designed. A predetermined grid for an electronic circuit being designed is selected through interaction with a user through a graphical user interface. An input file created by the user defining objects to be plotted to the grid is read. Object locations relative to the grid and connections between objects are checked. Adjustments are made by moving objects as necessary to align with the grid, and to ensure connections between the objects. A design file of the adjusted logical representation is then written for use in completing a circuit design.

In an exemplary embodiment, the objects are parts, represented as symbols, and lines, and the adjustments are made separately for parts, as compared to adjustments made for lines.

In another exemplary embodiment, adjustment of lines is conducted through vector analysis to determine any adjustment necessary to establish connections between objects. Adjustment of parts is made so that the parts are located at discrete x, y coordinate locations on the grid.

A system is also provided for generating a logical representation of an electronic circuit being designed. The system includes a computer. A circuit design software program is loaded on the computer. The circuit design software program includes program code for setting a predetermined grid for an electronic circuit being designed through interaction by a user through a graphical user interface. Program code is also provided for reading an input file created by a user defining objects to be plotted to the grid. Program code also is provided for checking object locations relative to the grid, and for checking connections between objects. In addition, program code is provided for making adjustments by moving objects as necessary to align with the grid and ensure connections between objects. Finally, program code is provided for writing a design file of the adjusted logical representation for use in completing a circuit design.

Other aspects of this system include additional code for implementing steps of the methods as previously described.

Another embodiment provides a computer program product. The computer program product includes media for containing code thereon. A circuit design software program is on the media and includes program code as previously described with respect to the system.

These and other advantages and features that characterize the invention are set forth in claims appended hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION OF THE INVENTION

In one aspect, embodiments consistent with the invention can take the form of standalone systems, systems distributed throughout a network with program code thereon, or as a program product on media.

Figure 1:
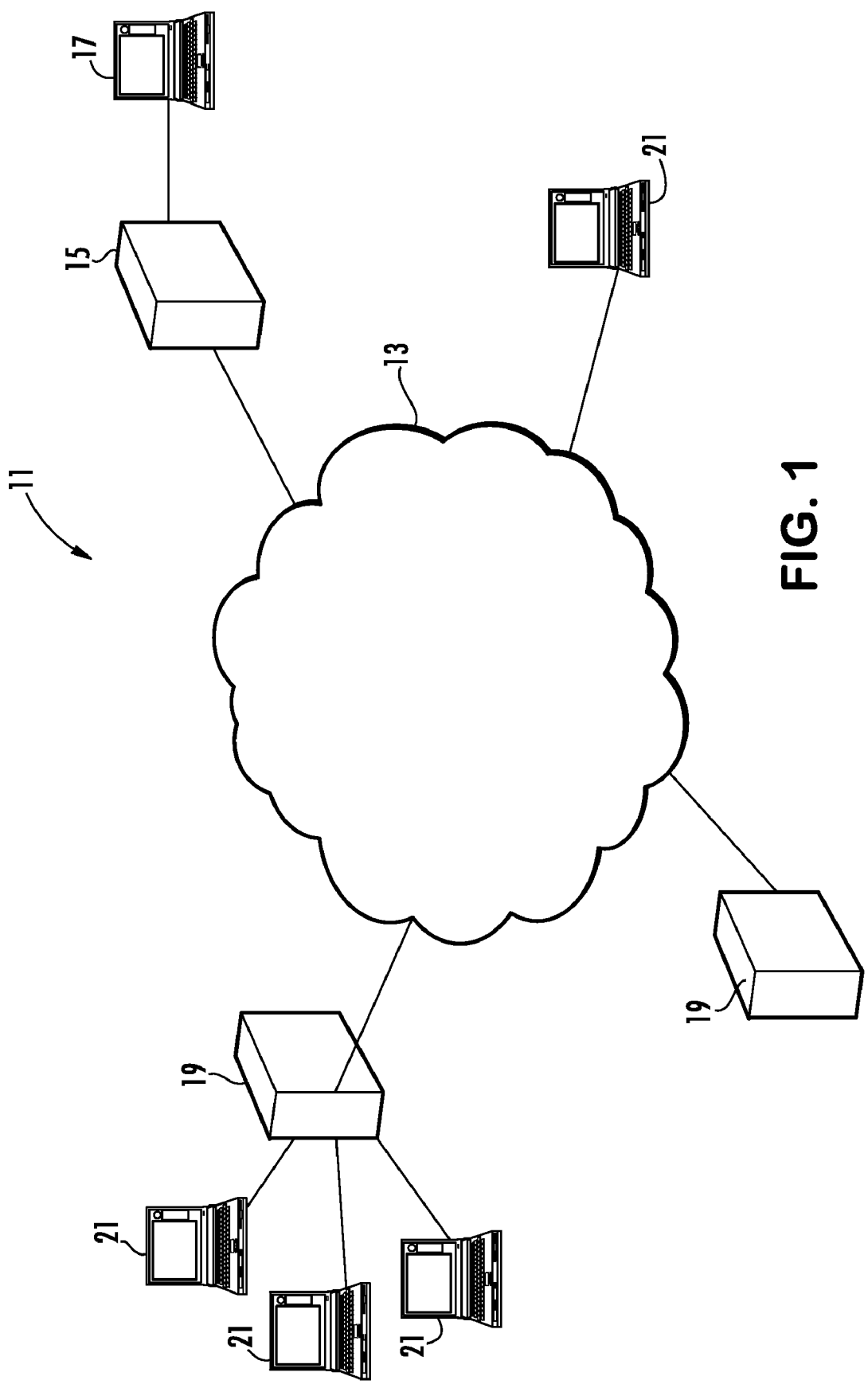
FIG. 1 shows a general system including a network with multiple systems connected thereto on which the invention may be implemented.

FIG. 1 illustrates a system 11 in which the method of the invention may be implemented. The system 11 includes a network 13, such as the internet, having multiple components connected thereto. Included among such components can be a server 15 including a user terminal 17 connected thereto. Alternatively, a standalone terminal 21 may be connected directly to the network 13. In another exemplary modification, a server 19 may be connected, and is accessed, for example, by a separate terminal, such as terminal 21 directly through the network 13 for implementing aspects of the invention. Yet still further, a server 19 may also be connected to the network 13 and have multiple standalone terminals 21 connected thereto for communication through server 19 onto and through the network 13.

As will be appreciated by those of ordinary skill in the art, various components and aspects of the method, program product and system of the invention can be distributed throughout various locations on a network 13, while still maintaining the basic capabilities and functionalities described herein. The method is implemented through the use of a computer program having specific program code for implementing the steps of the method, and can be in the form of a computer program product on media which may be part of any one of the components shown in FIG. 1. In another exemplary embodiment, the invention can also be implemented on removable media which is transportable between the different components shown in FIG. 1.

Figure 2:
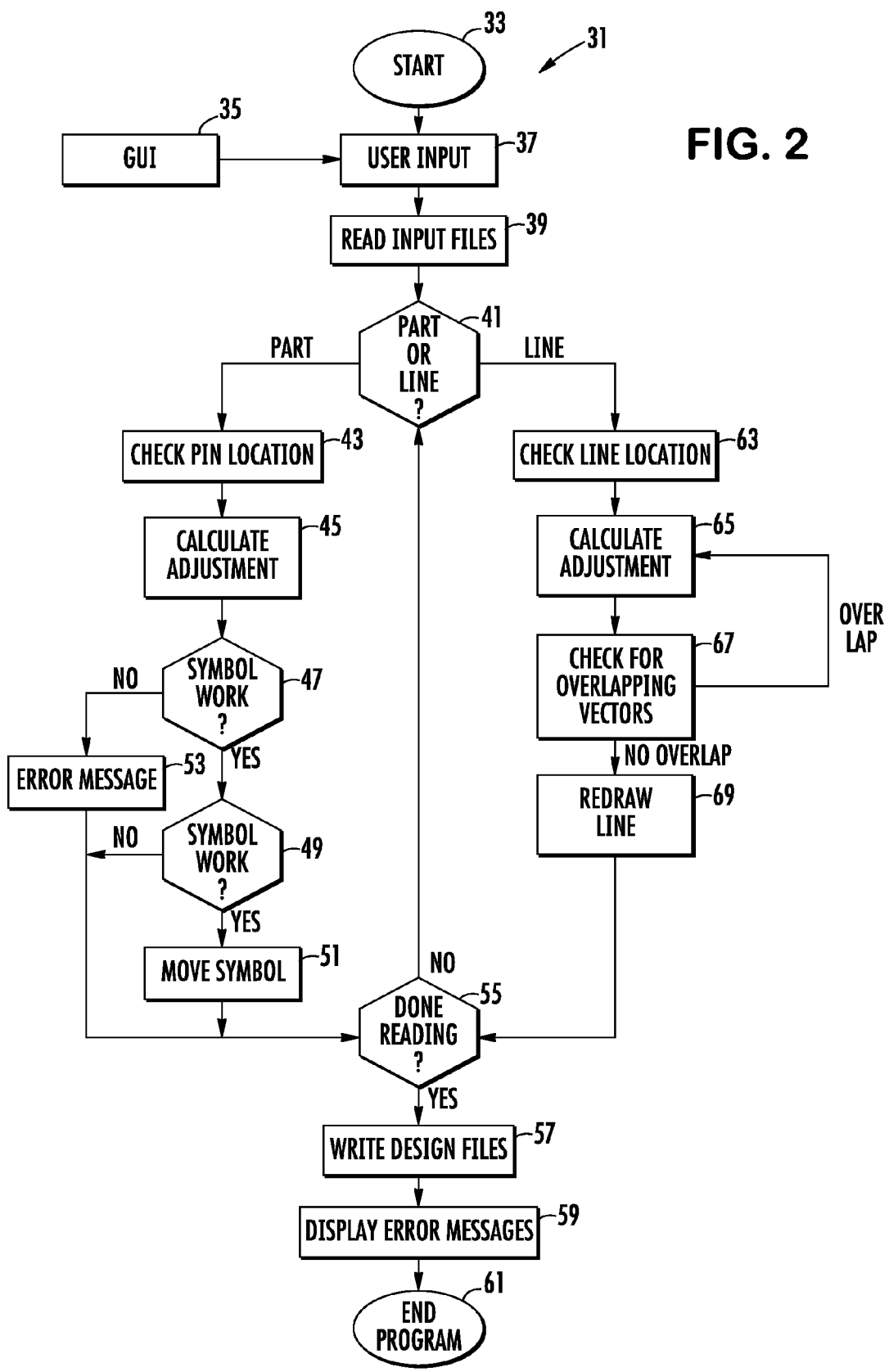
FIG. 2 is a general flow diagram 31 illustrating one embodiment of an implementation of the method in accordance with the invention.

FIG. 2 illustrates a method of the invention. At the start 33 of the method, a user proceeds to interact with a graphical user interface 35 to set a grid on which a user would like to have all pages of a circuit design. The user can also select which pages of a circuit design they would like the grid alignment to affect, thus exempting selected pages from having the grid implemented thereon.

The user may also select from a wide array of options as to what to implement on the grid or snap onto the grid, such as page borders, headings, text, symbols, wires and wire names. The user input is thus entered into the system 37 and the design input files are read 39 into the system.

The information in the input files is filtered. By the term "filtered" is meant removing undesired information from the ASCII design files. More specifically, information such as titles of the pages, page numbers, date codes, etc. do not operate with the program. Thus, the method filters for items for the grid. More particularly, the system looks for anything that is displayed on the page that the user has selected to have "snapped" to the grid. The objects being "snapped" onto the grid are sorted into two categories 41, either lines or symbols. A symbol is a pre-drawn object and corresponds to a circuit part or component that cannot be altered directly by the software. A line is something that can be redrawn by the software directly, for example, wiring.

If the object is a part represented by a symbol, its position is checked with respect to pin locations against the grid 43. If the symbol does not lie on the selected grid location, a calculation is conducted 45. More particularly, a check is first made to ensure that the part fits on the selected grid 47. If it does not fit on the selected grid, an error message is generated 53. If it fits on the selected grid, it is determined whether it is desirable to move the part 49. If the part is compatible with the grid, then the method looks for the nearest grid points to which to move the part. In implementing this step, the direction that has the least distance for the part to travel is selected, and the part is moved to the proper grid point, and the newly moved part is then replaced according to the user's defined grid 51.

At this point, if additional parts, as represented by symbols, are to be moved, then the process returns back to block 41 and then the next symbol or line is read. If the next object is a line, the process moves to the right side of the diagram where the line location 63 is checked. If the line location is not acceptable, the method looks for the best way to re-draw the line and "snaps" it to the selected grid. The adjustment is calculated 65 optionally through a vector analysis, which is conventional and well known to those of ordinary skill in the art. An adjustment is made so that line segments do not overlap, and the process attempts to minimize the number of times a line will cross another line. Thus, as part of conducting the calculation for the adjustments, lines are checked for overlapping sectors 67. If there is an overlap, the process returns to a prior block to recalculate the adjustment 65 until there is no overlap, and the line is then redrawn 69 and the process proceeds to block 55 at which it is again determined whether reading of all of the input file has been completed. Thus, this is an iterative process.

Once all adjustments have been made, design files are written 57 for export, and any error messages are displayed 59, after which the program ends 61.

Figure 3:
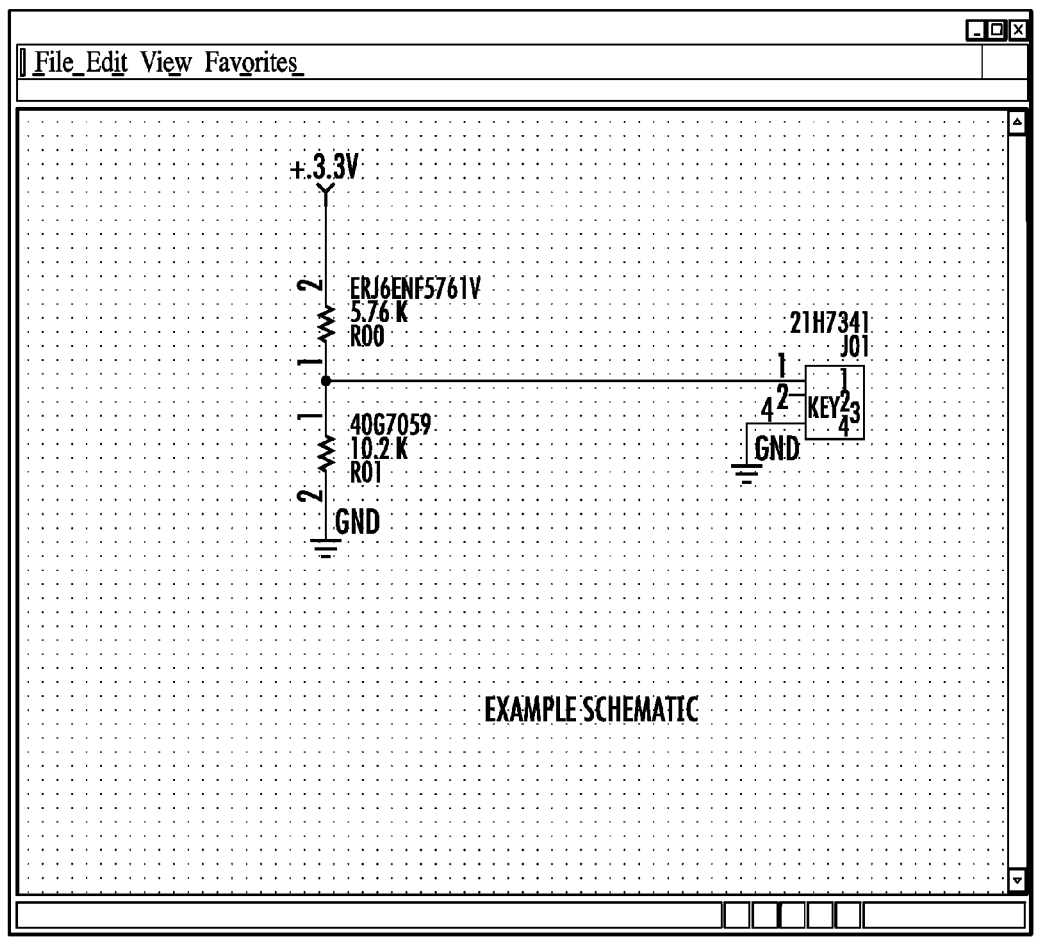
FIG. 3 is an example schematic illustrating how a circuit may be logically represented on a user selected grid.
Figure 4:
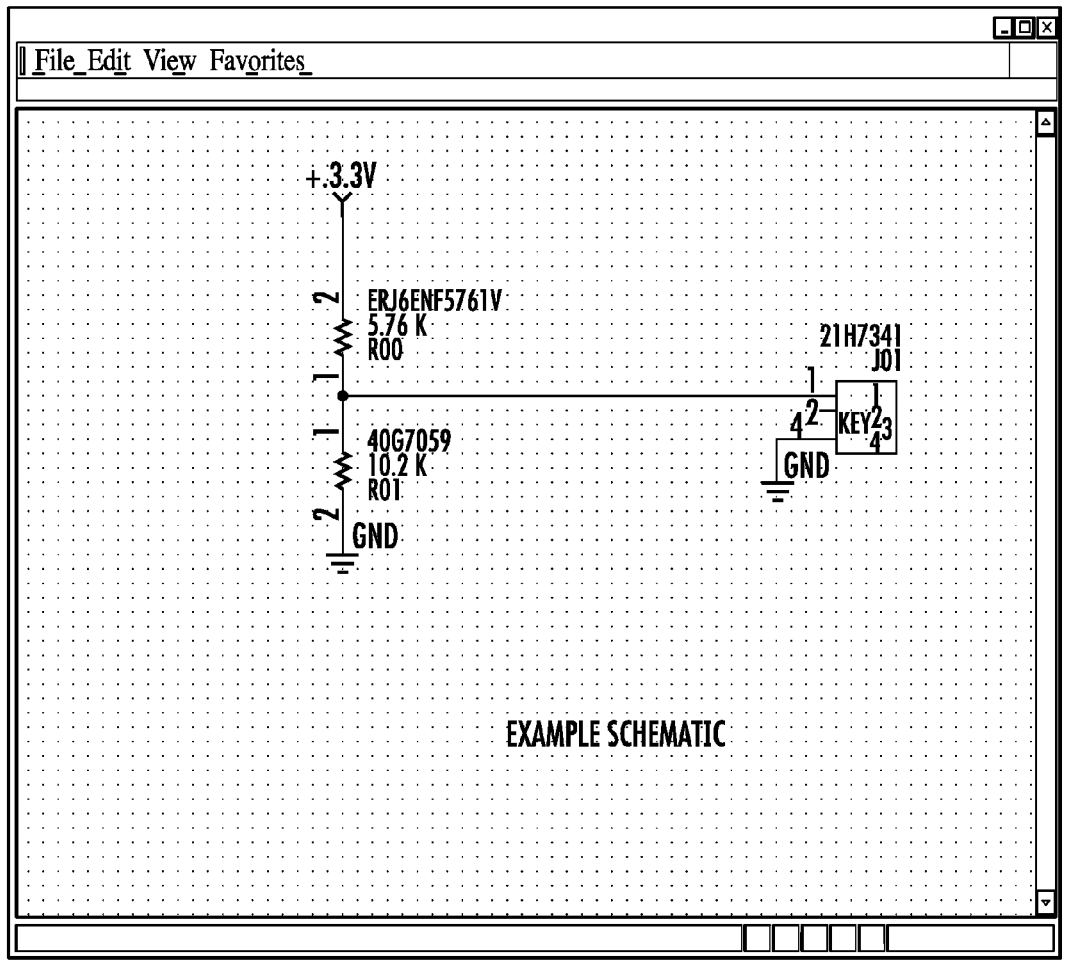
FIG. 4 is a view as in FIG. 3, but showing how adjustments may be made to the circuit schematic to correspond to discrete coordinates on the grid and to ensure that all components are properly connected.

In order to better understand the invention, reference now is made to FIGS. 3 and 4. FIG. 3 illustrates an example schematic which is "snapped" to a grid selected by a user, but which does not match to the grid coordinates in a proper manner. Through implementation of the method on the system of the invention, FIG. 4 illustrates how a circuit schematic can be adjusted to match discrete coordinates on a grid selected by a user.

As will be readily apparent to those of ordinary skill in the art, and as already discussed, such a system can be implemented easily in current software systems such as those available commercially under the name Concept HDL. The system, method and program takes user input through a graphical user interface and allows a user to select the default grids, or to enter a custom grid. Concept files are read into the system and symbols are separated from lines. The symbols are "snapped" to the grid selected by the user, as are the lines. When utilized across different locations throughout the world, schematics may be implemented from other locations, which may be on any grid. The system, method and program allow implementing such schematics into a different design shop with a grid selected by that design shop.

While the present invention has been illustrated by a description of different embodiments and while these embodiments have been described in considerable detail, it is not the intention of the applicants to restrict, or in any way limit the scope of the appended claims to such details. The invention in its broader aspects is therefore not limited to the specific details, representative apparatus, method and program, and illustrative example shown and described. Accordingly, departures may be made from such details without departing from the spirit or scope of Applicants' general inventive concept.

What is claimed is:

1. A computer implemented method of generating a logical representation of an electronic circuit being designed, comprising:

receiving an input file with a schematic created on a first grid, wherein a portion of the schematic is designated by a user to be snapped onto a second grid;

setting the second grid for the electronic circuit, wherein the electronic circuit is designed through interaction by a user using a graphical user interface;

reading in a design input file created by the user, wherein the input file defines objects plotted to said second grid;

checking object locations relative to the second grid and checking connections between objects;

making adjustments by moving objects as necessary to align with the second grid and ensure connections between objects; and writing a design output file of the logical representation.

2. The method of claim 1, wherein said objects comprise parts and lines, and wherein said adjustments are made separately to the parts and to the lines.

3. The method of claim 2, wherein said adjustment of lines is conducted through a vector analysis to determine any adjustment necessary to establish connections between the objects.

4. The method of claim 2, wherein said adjustment of parts is made so that said parts are located at x, y coordinate locations on the second grid.

5. The method of claim 4, further comprising checking pin locations of the parts and adjusting the pin locations to match the x, y coordinates.

6. The method of claim 1, further comprising entering control rules and criteria pertaining to movable objects on the circuit through said graphical user interface.

7. The method of claim 1, wherein the method is repeated iteratively for each object in the circuit being designed.

8. The method of claim 1, further comprising placing the objects in a new location after an adjustment where the circuit design does not satisfy user defined design criteria.

9. The method of claim 4, further comprising placing the parts in a new location after an adjustment where the circuit design does not satisfy user defined design criteria.

10. The method of claim 3, further comprising placing each line in a new location after said adjustment where the circuit design does not satisfy user defined design criteria.

11. A system to generate a logical representation of an electronic circuit being designed, the system comprising:

a computer; and a circuit design software program loaded on said computer, said circuit design software program comprising:

program code to receive an input file with a schematic created on a first grid, wherein a portion of the schematic is designated by a user to be snapped onto a second grid;

program code to set the second grid, wherein the electronic circuit is designed through interaction by a user using a graphical user interface;

program code to read in an input file created by a user, wherein the input file defines objects to be plotted to said second grid;

program code to check object locations relative to the second grid and for checking connections between objects;

program code to make adjustments by moving objects as necessary to align with the second grid, and to ensure connections between objects; and program code to write a design output file of the logical representation.

12. The system of claim 11, wherein said objects are parts and lines, and further comprising code to adjust location of lines through vector analysis to establish connections between objects, and code to adjust location of parts to locate parts at discrete x, y coordinate locations on the grid.

13. The system of claim 11, further comprising a graphical user interface configured to allow a user to enter control rules and criteria for movable objects on a circuit being designed.

14. The method of claim 11, further comprising code to place objects in a new location after an adjustment is made if it is determined the circuit design does not satisfy user defined design criteria.

15. The system of claim 12, further comprising code to place parts and lines in new locations after an adjustment is made if it is determined the circuit design does not satisfy user defined design criteria.

16. The system of claim 11, wherein said circuit design software program is constructed to place each object one at a time in an iterative process.

17. A computer program product, comprising:

non-transitory media; and a circuit design software program on said media, comprising:

program code to receive an input file with a schematic created on a first grid, wherein a portion of the schematic is designated by a user to be snapped onto a second grid;

program code to set the second grid, wherein the electronic circuit is designed through interaction by a user using a graphical user interface;

program code to read in an input file created by a user, wherein the input file defines objects to be plotted to said second grid;

program code to check object locations relative to the second grid and for checking connections between objects;

program code to mask adjustments by moving objects as necessary to align with the second grid, and to ensure connections between objects; and program code to write a design output file of the logical representation.

18. A computer program product as in claim 17, wherein said objects are parts and lines, and further comprising code to adjust location of lines through vector analysis to establish connections between objects, and code to adjust location of parts to locate parts at discrete x, y coordinate locations on the grid.

19. A computer program product as in claim 17, further comprising a graphical user interface configured to allow a user to enter control rules and criteria for movable objects on a circuit being designed.

20. A computer program product as in claim 17, further comprising code to place objects in a new location after an adjustment is made if it is determined the circuit design does not satisfy user defined design criteria.

* * * * *